R. L. GIBSON.
SUPPORTING DEVICE FOR SOUND BOX ARMS AND HORNS OF TALKING MACHINES.
APPLICATION FILED DEC. 11, 1905.
958,109.
Patented May 17, 1910.
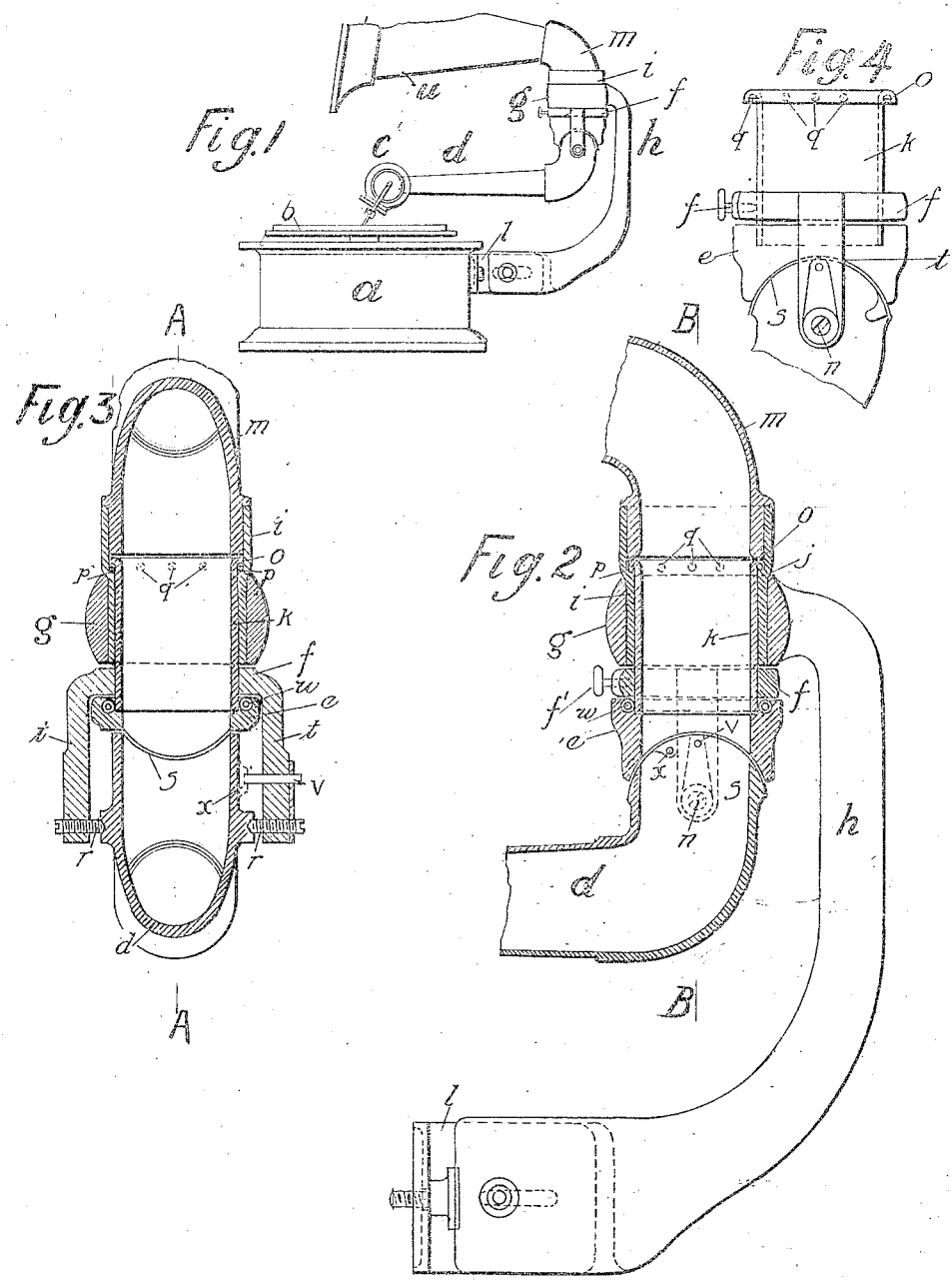
WITNESSES:
INVENTOR
Robert L. Gibson
BY
ATTORNEY.

UNITED STATES PATENT OFFICE.

ROBERT L. GIBSON, OF PHILADELPHIA, PENNSYLVANIA, ASSIGNOR TO VICTOR TALKING MACHINE COMPANY, A CORPORATION OF NEW JERSEY.

SUPPORTING DEVICE FOR SOUND-BOX ARMS AND HORNS OF TALKING-MACHINES.

958,109.                    Specification of Letters Patent.    Patented May 17, 1910.

Application filed December 11, 1905. Serial No. 291,197.

*To all whom it may concern:*

Be it known that I, ROBERT L. GIBSON, a citizen of the United States, and a resident of Philadelphia, State of Pennsylvania, have invented certain new and useful Improvements in Supporting Devices for Sound-Box Arms and Horns of Talking-Machines, of which the following is a full, clear, and complete disclosure.

More particularly my improvements relate to the devices for supporting the hollow sound-box carrying arm and horn in the bracket secured to the case of a talking machine.

It is my object to provide a simple and efficient construction by which the support of the sound-box carrying arm in proper position is assured notwithstanding irregularities in the bracket due to springing of the bracket arms or other causes. This object I accomplish by supporting the sound box carrying arm wholly in the upper free end of the bracket on both a vertical and horizontal axis by means of a rotary sleeve supported on ball bearings in a socket on the bracket, and carrying a ring piece at its lower end, in which the sound box carrying arm is mounted on horizontal pivots. The arm is thus supported by the bracket wholly from the top through the rotary sleeve, which, being mounted on ball bearings, may turn with very little friction. The ball bearings are formed by a series of balls supported on an annular shoulder in a sleeve carried by the socket piece of the bracket, and engaged by a flange on the upper end of the rotary sleeve. The upper end of the sleeve carried by the bracket socket forms a socket-piece for the horn.

The construction is not only very efficient for the purposes intended, but is simple and inexpensive and the parts may be easily assembled or taken apart.

In the accompanying drawings, Figure 1 is a side elevation of a talking machine constructed in accordance with this invention; Fig. 2 an enlarged side elevation partly in vertical section on line A—A of Fig. 3, of a portion of the same; Fig. 3 a transverse vertical section on line B—B of Fig. 2; Fig. 4 an enlarged fragmentary side elevation of a portion of the same; and Fig. 5 an enlarged fragmentary sectional perspective of a portion of the same.

Referring to the drawings, the case $a$ of the talking machine contains the motor which drives the turn-table or record support carrying the record $b$. A bracket $h$ is adjustably secured at its lower end to an arm $l$ on the said case $a$, and is provided at its upper end with a tubular socket $g$, in which is fitted a tubular sleeve $i$. The upper part of the sleeve $i$ receives the elbow $m$ to which the horn $n$ is secured.

The sleeve $i$ is formed with an annular offset or shoulder $j$ on the inside below the elbow socket portion. Within the lower portion of the sleeve $i$ is a sleeve $k$, which has its top turned over or flanged as at $o$ to form with the annular offset or shoulder $j$ an annular socket or way for a series of balls $p$. The sleeve $k$ is thus supported at the top on ball bearings within the sleeve $i$ and may turn freely upon them. To prevent the balls $p$ becoming bunched together, pins $q$ may be placed transversely through the flange $o$ in the sleeve $k$.

The lower end of the sleeve $k$ extends below the socket $g$ and sleeve $i$ and carries a ring $f$ which is secured by a set screw $f'$. This ring $f$ has depending arms $t\,t$ carrying pivots $r\,r$, in which is pivoted the head of the hollow arm $d$ which carries sound box $c$. The head of the hollow arm is upturned and curved as at $s$ from the pivots as centers, and between this curved end and the ring $f$ is interposed a tubular piece $e$ having its under face complementary to and resting on the curved end $s$. The top of the tubular piece $e$ receives the lower extremity of the sleeve $k$ and between the piece $e$ and ring $f$ is interposed a cushion $w$ preferably of rubber tubing, which enables the piece $e$ to yield slightly and thus prevents binding between its lower curved edge and the curved edge $s$ of the hollow arm. In this construction it will be observed that the hollow arm $d$, which carries the sound box $c$, is supported on the bracket wholly from the top on a vertical axis formed by the ball bearings between the sleeve $k$ and the sleeve $i$, on which it may turn freely with minimum friction. The arm $d$ is also pivoted on a horizontal axis formed by the pivots $r\,r$ carried by the ring $f$ secured to the rotary sleeve $k$. The hollow arm thus has both its horizontal and vertical axes formed in the upper free end of the bracket $h$, and, consequently, will not be so liable to be thrown out of alinement by any irregularity or springing of the bracket $h$, as if a rigid vertical axis were formed between the top of the bracket and its lower part.

The arm $d$ may be rocked on the pivots $r$ $r$ to raise and lower the sound box. To secure the arm and sound box in raised position, while a record disk is being removed and replaced, a spring catch $v$ may be carried by one of the arms $t$ adapted to engage a notch or recess $x$ on the upper end of the hollow arm.

What I claim as new and desire to secure by Letters Patent, is as follows:—

1. The combination with a bracket adapted to be attached at one end to the case of a talking machine, and having a tubular socket at its free end, a sleeve carried by said bracket-socket, and having its upper end formed as a socket to receive the horn, a rotary sleeve supported within said first sleeve and having its lower end projecting beyond the lower edge of the bracket-socket, a ring piece carried by said projecting end of the rotary sleeve, and a hollow sound box carrying arm mounted on horizontal pivots carried by said ring piece.

2. The combination with a bracket adapted to be attached at one end to the case of a talking machine, and having a tubular socket at its free end, a sleeve carried by said bracket-socket, and having its upper end formed as a socket to receive the horn, a rotary sleeve supported within said first sleeve and having its lower end projecting beyond the lower edge of the bracket-socket, a ring piece carried by said projecting end of the rotary sleeve, a hollow sound-box carrying arm mounted on horizontal pivots carried by said ring piece, and having its end upturned and curved, and a tubular piece having a complementary curved lower edge interposed between the ring piece and the upturned curved end of the hollow arm.

3. The combination with a bracket adapted to be attached at one end to the case of a talking machine, and having a tubular socket at its free end, a sleeve carried by said bracket-socket, and having its upper end formed as a socket to receive the horn, a rotary sleeve supported within said first sleeve, and having its lower end projecting beyond the lower edge of the bracket-socket, a ring piece carried by said projecting end of the rotary sleeve, a hollow sound-box carrying arm mounted on horizontal pivots carried by said ring piece, and having its end upturned and curved, a tubular piece having a complementary curved lower edge interposed between the ring piece and the upturned curved end of the hollow arm, and a yielding cushion interposed between said tubular piece and ring piece.

4. The combination with a bracket adapted to be attached at one end to the case of a talking machine, and having a tubular socket at its free end, a sleeve carried by said bracket-socket, and having its upper end formed as a socket to receive the horn, a rotary sleeve supported within said first sleeve on ball bearings and having its lower end projecting beyond the lower edge of the bracket-socket, a ring piece carried by said projecting end of the rotary sleeve, and a hollow sound-box carrying arm mounted on horizontal pivots carried by said ring piece.

5. The combination with a bracket adapted to be attached at one end to the case of a talking machine, and having a tubular socket at its free end, a sleeve carried by said tubular socket and formed with an internal annular shoulder, a series of balls supported by said shoulder, a rotary sleeve within the first sleeve having its upper end provided with a flange engaging said balls, a ring piece carried by the lower end of said rotary sleeve, and a hollow sound-box carrying arm mounted on a horizontal axis carried by said ring piece.

6. The combination with a bracket adapted to be attached at one end to a fixed support and having a tubular socket at its free end, of a sleeve carried by said bracket socket, said sleeve being provided with an enlarged end forming a shoulder resting against said bracket, a horn rotatably mounted within said enlarged end, a rotary sleeve supported upon said shoulder within said first mentioned sleeve, and a sound conveying arm depending from said rotary sleeve.

7. The combination with a fixed support, of a bracket rigidly attached at one end to said support, and having a tubular socket at its free end, of a sleeve carried by said bracket socket, said sleeve being provided with an enlarged end forming a shoulder resting upon the top of said bracket, and a horn rotatably mounted within said enlarged end of said sleeve.

8. The combination with a bracket adapted to be attached at one end to a fixed support, and having a tubular socket at its free end, of a sleeve carried by said bracket socket, and having its upper end formed as a socket to receive the horn, and having an annular shoulder resting against said bracket, a rotary sleeve supported within said first mentioned sleeve, and having a flange, the upper end forming with said shoulder a raceway, anti-friction means between said shoulder and flange, and a sound conveying arm depending from said rotary sleeve.

9. In a talking machine, the combination with a hollow support, of a sleeve carried in said support, a sound amplifier carried by one end of said sleeve, a rotary sleeve supported within said first mentioned sleeve and having one end projecting outside of the other end of said first mentioned sleeve, a ring piece carried by said projecting end of the rotary sleeve, and a hollow sound box arm carried by said ring piece.

10. In a talking machine, the combination with a hollow support, of a sleeve carried in said support, a sound amplifier carried by one end of said sleeve, a rotary sleeve supported within said first mentioned sleeve and having one end projecting outside of the other end of said first mentioned sleeve, a ring piece carried by said projecting end of the rotary sleeve, and a hollow sound box arm entirely supported by said ring piece.

11. In a talking machine, the combination with a support having a tubular socket, of a vertically arranged sleeve supported in said socket, a sound amplifier carried by the upper end of said sleeve, a rotary sleeve supported within said first mentioned sleeve and having its lower end projecting below the lower edge of said first mentioned sleeve, and a hollow sound box arm connected to and carried by said projecting end of said rotary sleeve.

12. In a talking machine, the combination with a support having a tubular socket, of a sleeve entirely supported by said socket, a rotary sleeve entirely supported from within said first mentioned sleeve and having one end projecting outside of said first mentioned sleeve, and a hollow sound box arm entirely supported by said projecting end of said rotary sleeve.

13. In a talking machine, the combination with a support having a tubular socket, of a sleeve carried by said socket, a rotary sleeve within said first mentioned sleeve, anti-friction rotary means between said sleeves, and a hollow sound box arm supported by said rotary sleeve.

14. In a talking machine, the combination with a support having a tubular socket, of a sleeve carried by said socket, a rotary sleeve supported within and entirely by said first mentioned sleeve, and a hollow sound box arm entirely supported by said rotary sleeve.

15. In a talking machine, the combination with a support having a tubular socket, of a sleeve fixed in said socket a sound amplifier carried by said sleeve, a rotary sleeve supported within and entirely by said first mentioned sleeve, and a hollow sound box arm entirely supported by said rotary sleeve.

16. In a talking machine, the combination with a support having a tubular socket, of a sleeve fixed in said socket a sound amplifier carried by said sleeve, a rotary sleeve supported within and entirely by said first mentioned sleeve, and a hollow sound box arm entirely supported by said rotary sleeve and movable with respect to said rotary sleeve.

17. In a talking machine, the combination with a support having a tubular socket, of a sleeve supported in said socket, a rotary sleeve supported within said first mentioned sleeve, and a hollow sound box arm carried by said rotary sleeve and rotatably adjustable with respect thereto.

18. In a talking machine, the combination with a support, having a tubular socket, of a sleeve supported in said socket, a rotary sleeve supported within and entirely by said first mentioned sleeve, and a hollow sound box arm pivoted to said rotary sleeve and rotatably adjustable with respect to said rotary sleeve about the axis of rotation of said sleeve.

19. In a talking machine, the combination with a support having a tubular socket, of a sleeve supported within said socket, a rotary sleeve supported within said first mentioned sleeve and having one end projecting outside of said first mentioned sleeve, a ring piece adjustably connected to said projecting end, a tubular sound box arm pivotally connected to said ring piece, and a tubular piece between said rotary sleeve and said sound box arm.

20. In a talking machine, the combination with a support having a tubular socket, of a sleeve supported within said socket, a rotary sleeve supported within said first mentioned sleeve and having one end projecting outside of said first mentioned sleeve, a ring piece adjustably connected to said projecting end, a tubular sound box arm pivotally connected to said ring piece, a tubular piece between said rotary sleeve and said sound box arm, and a yielding gasket between said ring piece and said tubular piece.

21. In a talking machine, the combination with a rotary sleeve, of a ring piece surrounding said sleeve and secured thereto, a tubular sound box arm pivotally connected to said ring piece, and a tubular piece between the said rotary sleeve and said sound box arm.

22. In a talking machine, the combination with a rotary sleeve, of a ring piece surrounding said sleeve and adjustably secured thereto, a tubular sound box arm pivotally connected to said ring piece, a tubular piece between the said rotary sleeve and said sound box arm, and a yielding gasket between said ring piece and said tubular piece.

In witness whereof, I have hereunto set my hand this twenty eighth day of November, 1905.

ROBERT L. GIBSON.

Witnesses:
ERNEST HOWARD HUNTER,
R. M. KELLY.